US 8,699,489 B2

(12) United States Patent
Nors (10) Patent No.: US 8,699,489 B2
(45) Date of Patent: Apr. 15, 2014

(54) METHOD AND ARRANGEMENT FOR TRANSFERRING DATA PACKETS

(75) Inventor: Niclas Nors, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 302 days.

(21) Appl. No.: 12/976,532

(22) Filed: Dec. 22, 2010

(65) Prior Publication Data
US 2012/0163382 A1 Jun. 28, 2012

(51) Int. Cl.
*H04L 12/28* (2006.01)

(52) U.S. Cl.
USPC .......................................... 370/392

(58) Field of Classification Search
None
See application file for complete search history.

(56) References Cited

U.S. PATENT DOCUMENTS

| | | | | |
|---|---|---|---|---|
| 6,151,322 | A * | 11/2000 | Viswanath et al. | 370/395.53 |
| 6,249,521 | B1 * | 6/2001 | Kerstein | 370/389 |
| 6,269,098 | B1 * | 7/2001 | Crayford | 370/389 |
| 6,680,945 | B1 * | 1/2004 | Merchant et al. | 370/395.53 |
| 6,775,290 | B1 * | 8/2004 | Merchant et al. | 370/395.53 |
| 6,999,452 | B1 * | 2/2006 | Drummond-Murray et al. | 370/389 |
| 7,079,537 | B1 * | 7/2006 | Kanuri et al. | 370/392 |
| 7,330,654 | B2 * | 2/2008 | Song et al. | 398/71 |
| 7,376,135 | B2 * | 5/2008 | Beck | 370/392 |
| 7,516,487 | B1 * | 4/2009 | Szeto et al. | 726/22 |
| 7,792,046 | B2 * | 9/2010 | Kucharczyk et al. | 370/244 |
| 8,250,646 | B2 * | 8/2012 | Zheng | 726/13 |
| 8,289,864 | B2 * | 10/2012 | Dolganow et al. | 370/252 |
| 8,369,334 | B2 * | 2/2013 | Yu | 370/392 |
| 2003/0110268 | A1 * | 6/2003 | Kermarec et al. | 709/227 |
| 2003/0133456 | A1 * | 7/2003 | Beck | 370/395.2 |
| 2003/0190168 | A1 * | 10/2003 | Song et al. | 398/168 |
| 2004/0172480 | A1 * | 9/2004 | Hirose et al. | 709/238 |
| 2006/0015874 | A1 * | 1/2006 | Sainomoto et al. | 718/102 |
| 2007/0121619 | A1 * | 5/2007 | Kimbrough et al. | 370/389 |
| 2007/0121623 | A1 * | 5/2007 | Garcia et al. | 370/389 |
| 2007/0121624 | A1 * | 5/2007 | Kimbrough et al. | 370/389 |
| 2007/0121628 | A1 * | 5/2007 | Gainer et al. | 370/390 |

(Continued)

FOREIGN PATENT DOCUMENTS

| | | |
|---|---|---|
| EP | 1 328 091 A1 | 7/2003 |
| EP | 1 351 449 A1 | 10/2003 |

OTHER PUBLICATIONS

International Search Report Corresponding to International Application No. PCT/SE2011/050022; Date of Mailing: Oct. 11, 2011; 12 pages.

*Primary Examiner* — Ayaz Sheikh
*Assistant Examiner* — Faiyazkhan Ghafoerkhan
(74) *Attorney, Agent, or Firm* — Myers Bigel Sibley & Sajovec, P.A.

(57) ABSTRACT

A method in an access device for handling data packets transferred between a user device and a communication services network. The access device receives a first data packet coming from the user device, the first data packet having a source address. Then, occurrence of service tag in the received packet is detected, where the service tag indicates a type of communication service. A packet handling rule is then determined for the source address based on the detected occurrence of service tag. Occurrence of service tag in any subsequent data packets referring to the source address or to a port the first packet was received on, is then handled according to the packet handling rule. Thereby, a flexible packet forwarding mechanism can be achieved in the access device for any types of connected user devices. Related access devices are also disclosed.

15 Claims, 4 Drawing Sheets

(56) References Cited

U.S. PATENT DOCUMENTS

| | | | |
|---|---|---|---|
| 2007/0121654 A1* | 5/2007 | Khill | 370/401 |
| 2008/0112403 A1* | 5/2008 | Larsen et al. | 370/389 |
| 2008/0117902 A1* | 5/2008 | Vinneras | 370/389 |
| 2009/0097492 A1* | 4/2009 | Monette et al. | 370/401 |
| 2009/0154471 A1* | 6/2009 | Kim et al. | 370/395.53 |
| 2009/0162063 A1* | 6/2009 | Mizutani et al. | 398/58 |
| 2009/0260083 A1* | 10/2009 | Szeto et al. | 726/22 |
| 2009/0262728 A1* | 10/2009 | Stademann | 370/352 |
| 2009/0323525 A1* | 12/2009 | Chen et al. | 370/230 |
| 2010/0008365 A1* | 1/2010 | Porat | 370/392 |
| 2010/0074187 A1* | 3/2010 | Sun et al. | 370/329 |
| 2010/0080239 A1* | 4/2010 | Sergeev et al. | 370/401 |
| 2010/0098419 A1* | 4/2010 | Levy et al. | 398/63 |
| 2010/0316053 A1* | 12/2010 | Miyoshi et al. | 370/392 |
| 2011/0026527 A1* | 2/2011 | Shao et al. | 370/392 |
| 2011/0162013 A1* | 6/2011 | Bagasra et al. | 725/74 |

\* cited by examiner

METHOD AND ARRANGEMENT FOR TRANSFERRING DATA PACKETS

FIELD OF THE INVENTION

The invention relates generally to a method and arrangement in an access device for handling data packets transferred between a user device and a communication services network.

BACKGROUND

Network operators and other service providers are able to offer a range of different communication services to end-users, which is possible as new technologies allow for increased capacity in the networks and more and more advanced end-user devices are introduced on the market. For example, broadband services are being developed which can be realized by means of an access device to which end-users can connect their equipment in order to communicate data packets with different service nodes in a communication services network when using corresponding communication services.

The access device, e.g. a so-called "Broadband Network Access Device (BNAD)" or similar, provides a link to the service network and can basically be owned and controlled by a service provider, such as a network operator, and may be installed on the premises of a household, office, enterprise, etc., where end-users are located when using the services. Effectively, the access device works as an access bridge between the end-user equipment and the service network, as schematically illustrated by an example in FIG. 1. In the following description, the generic term "user device" is used to represent any consumer equipment that can be used by end-users for taking part in communication services. Further, the generic term "access device" represents a BNAD or any equivalent node capable of transferring data packets between one or more end-user devices and a communication services network.

Figure 1:
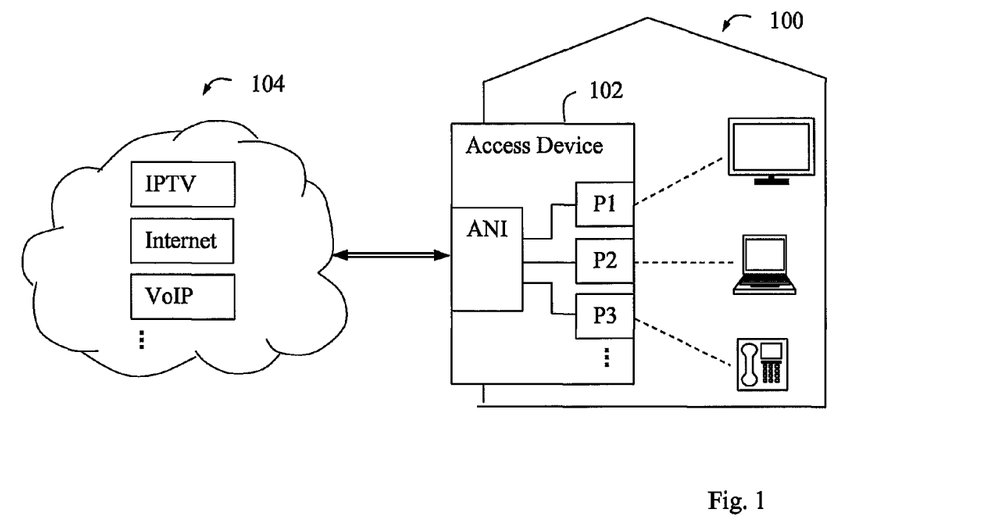
FIG. 1 is a block diagram illustrating a first exemplifying communication scenario involving an access device, according to the prior art.

In this figure, a household 100 has an access device 102, e.g. a BNAD, installed which provides access to various services in a service network 104, and the device 102 may be controlled by an operator offering the services to end-users, e.g. those present in the household 100. In this example, three different user devices are shown in household 100, including a TV set, a PC (Personal Computer) and a telephone. The access device 102 has multiple connection ports P1, P2, P3, ... to which end-users in the household 100 can connect their devices, as indicated by dashed lines. In conventional access devices having such multiple connection ports, each port is dedicated and coupled to a specific service in the network 104, here exemplified as IPTV (Internet Protocol TV), Internet access and VoIP (Voice over IP).

The ports P1, P2, P3, ... are linked to an Access Network Interface "ANI" which is configured to join each port to its corresponding service in network 104. The connection ports are commonly also referred to as "UNI" (User Network Interface). Such differentiated ports for different services are required as the service traffic over the access device 102 typically must be treated differently depending on the service and type of user device.

The service network 104 requires that packets communicated with the user devices have so-called VLAN (Virtual Local Area Network) tags identifying or indicating the type of service of the packets and also indicating a traffic priority, in order to properly handle and switch the packets to a correct destination, which is common for such service networks. However, most types of user devices are not configured to use VLAN tags when communicating packets, and in that case the access device 102 must add such VLAN tags to outgoing packets (upstream) coming from the user devices, and remove VLAN tags from incoming packets (downstream) coming from service network 104. The handling of VLAN tags in data packets is thus dependent on which port the packets are communicated.

Consequently, it is required that the end-user connects a particular user device to the correct port in order to access a corresponding service in network 104, which is necessary since different packet handling rules must be applied for different services as explained above. In other words, it is necessary to handle the packets depending on what type of user device will be connected, which is not known to the operator when configuring the access device before installation. If the access device has equivalent ports with the same packet handling rules configured, it would only be possible to provide a single corresponding service.

In this access device 102, port P1 provides access to the IPTV service, port P2 provides access to the Internet service, and port P3 provides access to the VoIP service, the ports P1-P3 being configured differently. The user devices must therefore be connected accordingly to obtain access to the services and to ensure that proper VLAN tags are used in the packets outside the household 100. The ports may be marked with different colors or similar to help the user connect the devices to the correct ports.

Nevertheless, having such dedicated ports in the access device 102 entails a potential risk for human errors, i.e. a user device may unwittingly be connected by the user to the wrong port so that the wanted service cannot be provided. This behaviour may result in unnecessary frustration and even calls to a help desk or the like in some cases.

Figure 2:
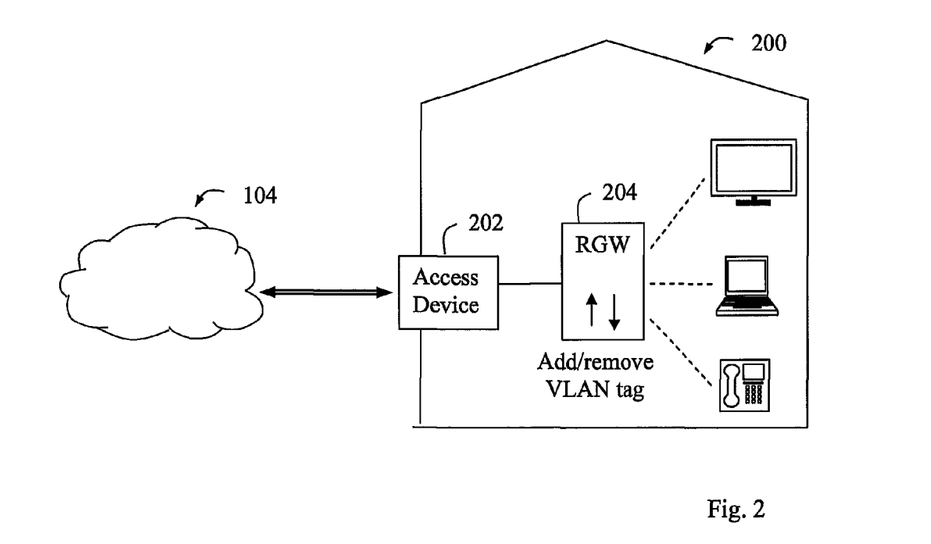
FIG. 2 is a block diagram illustrating a second exemplifying communication scenario involving an access device, according to the prior art.

FIG. 2 illustrates another use case where a household 200 comprises a local network with user devices connected to a residential gateway (RGW) 204 which is linked to an access device 202 by a single cable connected to a single port in the access device 202, device 202 providing access to services in a service network 104. In this case, the RGW 204 is configured to add and remove VLAN tags to upstream and downstream packets, respectively, since the access device 202 is basically unaware of which type of user device is currently communicating through the single cable and port. The RGW 204 also uses the VLAN tags in incoming downstream packets to identify the services for determining which user device to send the packets to, and also to set different priorities to different traffic streams over the same physical interface and cable.

On the other hand, if a user device is connected directly to access device 202 and sends untagged upstream packets, the access device 202 could be configured with software capable of identifying the type of device and adding corresponding VLAN tags to the upstream packets. Alternatively, the access device 202 may add operator-defined default tags to outgoing packets, which correspond to a specific service, e.g. Internet access. However, access device 202 may not know whether to remove VLAN tags from downstream packets or not, as it is unaware of the capabilities of a directly connected user device which may or may not be configured to receive and understand VLAN tagged packets.

In either case, the operator is able to configure the access device 102, 202 to handle the traffic of packets to/from the household depending on the VLAN tags, e.g. using a filtering mechanism in access device 102, 202 when incoming downstream packets with certain approved VLAN tags are forwarded to corresponding user devices, while incoming packets with non-approved or no VLAN tags will be discarded altogether. In this process, the VLAN tag of an incoming downstream packet may be matched to a VLAN filtering table in the access device 102, listing all allowed VLAN tags.

It has been identified as a problem that it is difficult to configure an access device, such as a BNAD, to cope with any of the above cases in an efficient, flexible and user-friendly manner. On one hand, it is possible to implement a software-executed solution in the access device to provide a flexible mechanism for adding and removing proper VLAN tags on a per packet basis so that varied tagging rules are applied per packet, allowing for different connections of user devices to any ports in the access device. However, this processing of each packet is somewhat time-consuming and will inevitably result in relatively slow and limited packet throughput or bandwidth, thus not allowing for e.g. high speed data traffic.

On the other hand, it is possible to implement a fixed configuration in dedicated hardware in the access device for handling packets in a static manner, effectively allowing for high throughput or bandwidth. However, this would not allow for switching between different connection scenarios of user devices, e.g. as exemplified above, unless the hardware configuration in the access device is also changed accordingly for each scenario, which is deemed unpractical since manual action by the operator is required, most likely triggered by complaint from the user that the service does not work. The current hardware solutions as such are thus generally not responsive to differentiated traffic, e.g. when the connection of user devices to different ports is changed.

SUMMARY

Embodiments of the invention may address at least some of the problems and shortcomings outlined above. In particular, some embodiments may accomplish proper handling of data packets when communicated between a communication services network and different types of users devices by means of an access device.

According to one aspect, a method is provided for handling data packets transferred between a user device and a communication services network, which is executed by the access device. In this method, the access device receives a first data packet coming from the user device, the first data packet having a source address. Then, occurrence of service tag in the received first data packet is detected, where the service tag indicates a type of communication service.

The access device then determines a packet handling rule for the source address based on the detected occurrence of service tag in the first data packet. After that, occurrence of service tag in one or more subsequent data packets referring to the source address or to a specific port the first packet was received on in a user interface of the access device, is handled according to the packet handling rule. Thereby, a flexible packet forwarding mechanism can be achieved in the access device for any types of connected user devices, at the same time allowing for high throughput and data rates and without requiring the use of dedicated ports or manual intervention for reconfiguring the access device, e.g. when the connection of one or more users devices is changed.

According to another aspect, an arrangement is provided in an access device configured to handle data packets transferred between a user device and a communication services network. In this arrangement, a user interface in the access device is adapted to receive a first data packet coming from the user device, the first data packet having a source address. Further, a packet analyzer in the access device is adapted to detect occurrence of service tag in the received first data packet, which service tag indicates a type of communication service, and to determine a packet handling rule for said source address based on the detected occurrence of service tag in the first data packet. The arrangement in the access device also comprises a packet processor adapted to handle occurrence of service tag in subsequent data packets referring to said source address or to a specific port the first packet was received on in the user interface, according to the packet handling rule. The benefits of using this arrangement correspond to those mentioned above for the method.

The above method and arrangement may be configured and implemented according to different optional embodiments. In one possible embodiment, if the one or more subsequent data packets are upstream packets coming from the user device and lacking a service tag, the packet handling rule could dictate that a service tag is added to the packets before forwarding the packets to the communication services network. If the one or more subsequent data packets are upstream packets received on the specific port, a port identifier may be added to the packets, wherein the packet handling rule can be applied to the subsequent data packets based on the port identifier. The first data packet and one or more subsequent data packets may also be upstream packets received directly from the user device or from a residential gateway to which the user device is connected.

In another possible embodiment, if the one or more subsequent data packets are downstream packets coming from the communication services network and comprising a service tag, the packet handling rule could dictate that the service tag is removed from the packets before forwarding the packets towards the user device.

In further possible embodiments, capturing the first data packet for detecting occurrence of service tag may be triggered when detecting that the source address in the first data packet is unknown. If the source address is a MAC (Medium Access Control) address, the first data packet may be captured by means of a MAC address learning function in the access device. Capturing the first data packet for detecting occurrence of service tag may also be triggered by any of: detecting that the first data packet refers to authentication, detecting connection to or disconnection from the access device, and preset intervals to refresh the packet handling rule.

The service tag may be a VLAN tag comprising a VLAN (Virtual Local Area network) ID (identity) that has been configured by an operator of the communication services network to identify the communication service used by the user device. The network may thus require that such a VLAN tag is included in the packets for proper routing and handling of the packets and the network will thus not be affected by this solution.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided to enable proper handling of data packets in an access device when transferring data packets communicated between a user device and a communication services network. This solution can be implemented in the access device, e.g. a BNAD or similar access bridge between the user device and the service network. The user device may be any ordinary communication device capable of communicating data packets with the communication services network, e.g. as exemplified above. The solution allows for any type of user device to be connected to any port of the access device in a flexible manner, and it is not necessary to know the type of user device and corresponding service in beforehand. The access device can also have a single port.

Also, one or more user devices may be connected to the access device via a local network gateway such as an RGW. It is also possible to change the connection to another type of user device without requiring manual action.

In this solution, the access device handles communicated data packets depending on the occurrence of service tag in a first data packet received from the user device, e.g. when the latter is connected to the access device for accessing a service in the communication services network. It should be noted that this solution allows the user device to be connected to any port of the access device, thus not requiring that the user device is connected to a specific port dedicated to a service used by the user device as in the above-described known technique where ports of different colors were used to aid the user. The solution to be described herein basically includes a learning or discovery phase when the first packet is analyzed to determine how to handle occurrence of service tag in subsequent packets, and a run-time phase when subsequent packets are handled and forwarded according to the learning or discovery phase.

In this description, the term "service tag" represents an indicator or the like that may or may not occur in the first packet and which identifies or indicates a type of communication service used by the user device. In practice, the service tag may be a conventional VLAN tag or other equivalent service indicator which thus may be included in the packets depending on the service. Further, the term "first packet" is used to distinguish this packet from any subsequent packets communicated to or from the user device to be handled according to this solution, although one or more packets may have been sent from the user device before the "first" packet, which lies outside this solution.

Figure 3:
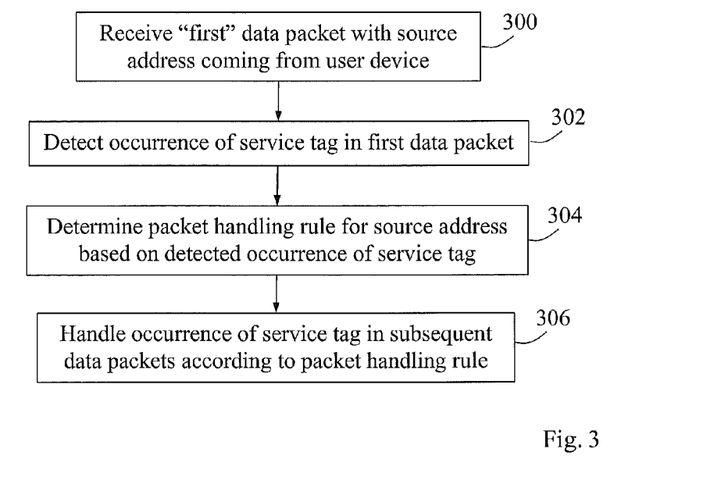
FIG. 3 is a flow chart of a procedure for handling data packets in an access device, according to an exemplifying embodiment.

An exemplifying procedure of handling data packets in an access device, will now be described with reference to the flow chart in FIG. 3. This procedure can thus be executed by the access device for handling packets transferred between a user device and a communication services network, assuming that service tags are generally required for routing and handling packets in the communication services network. The user device may be connected to the access device directly or via an RGW or other bridging entity, e.g. in the manner shown in FIG. 1 and FIG. 2, respectively, to access a service in the communication services network. This solution can be used for any user device and service and it is not required that the user device must be connected to any particular port of the access device.

In a first action 300, the access device receives a "first" data packet coming from the user device, either directly or via an RGW or similar, and the first packet has a certain source address "SA" which is common practice when communicating data packets from a packet sender, i.e. the source being the user device. The source address is typically placed in a header of the packet or the like. As mentioned above, the first data packet may be the very first packet being sent from the user device after connection to the access device, or it may otherwise have been preceded by one or more packets which are outside this solution. The first data packet of this solution is used in a learning or discovery phase as follows.

In a next action 302, the access device analyzes the first packet to detect occurrence of any service tag in the packet, e.g. a VLAN tag, indicating what type of communication service that is essentially addressed by the packet. The user device may or may not be capable of using such service tags in communicated packets, which the access device will thus learn about in this action. For example, the occurrence of VLAN tag can in some cases be detected by checking the four first bytes in the packet, according to prevailing standards.

The access device then determines a packet handling rule for the source address in the first packet based on the detected occurrence of service tag in the first data packet, in a further action 304. The packet handling rule is determined to dictate how to handle occurrence of service tag in any subsequent data packets communicated to or from the user device and referring to said source address, thus using the source address effectively as a key.

If the subsequent data packets are upstream packets coming from the user device, and the packets from the user device lack a service tag, including the first packet, the packet handling rule would dictate that a suitable service tag is added to the packets before forwarding them to the communication services network. The added service tag should correspond to the service used by the user device. On the other hand, if downstream packets coming from the communication services network comprise a service tag and it was learned from the first packet that the user device does not use service tags, the packet handling rule would dictate that the service tag is removed from the packets before forwarding them towards the user device. If it was learned from the first packet that the user device is capable of using service tags, the packet handling rule would dictate that the service tag is kept in the downstream packets. This action 304 basically concludes the learning or discovery phase of this solution.

The access device can now enter the run-time phase of this solution and accordingly handles occurrence of service tag in one or more subsequent data packets referring to said source address or to a port the first packet was received on, according to the packet handling rule, in a final shown action 306. Some examples of applying the packet handling rule were described above. This action may thus represent the behavior of the access device for as long as the user device remains connected thereto and whenever packets are communicated over the access device referring to said source address.

The first packet is thus "captured" and analyzed by the access device in order to determine the packet handling rule. There are different ways of triggering the capturing and analysis of the first packet. Firstly it may be detected that the first packet is coming from a user device for which no packet handling rule has been determined yet, such as when the user device is connected to the access device for the first time. In that case, capturing the first data packet for detecting occurrence of service tag may be triggered by detecting that the source address in said first data packet is unknown, or that a device connects to a previously unused port. The source address may be a MAC (Medium Access Control) address and in that case the first data packet can be captured by means of a MAC address learning function in the access device. Capturing the first data packet may also be triggered by detecting that the first data packet refers to authentication, which is typically the case when the user device initially starts to communicate with the services network.

Capturing the first data packet may also be triggered by detecting disconnection of a user device from the access device from a certain port assuming that when a first packet is received after the detected disconnection, it comes from a newly connected user device for which a packet handling rule should be determined. Capturing the first data packet may also be triggered at preset intervals to refresh an already existing packet handling rule, e.g. once a week or day, even if no new user device is detected.

Figure 4:
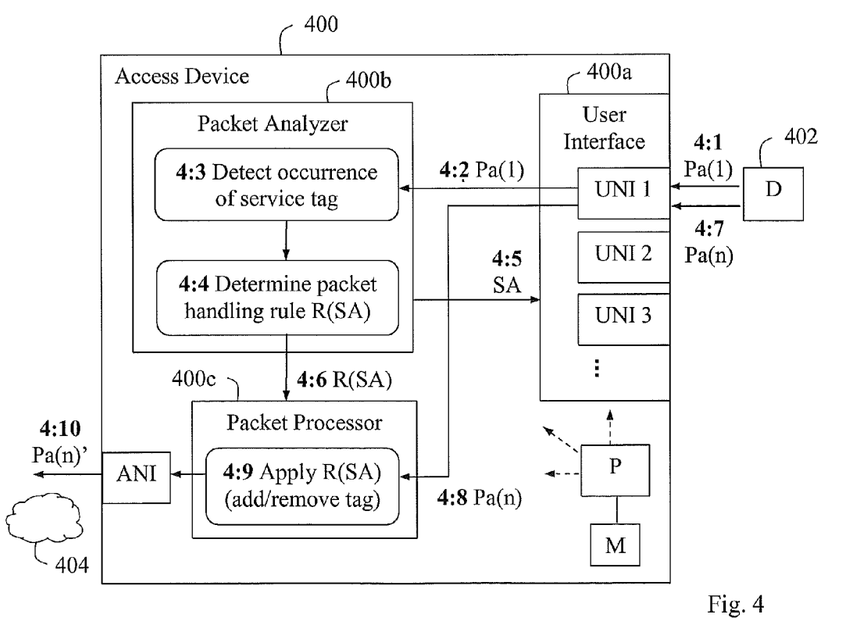
FIG. 4 is a block diagram illustrating an exemplifying arrangement and procedure in an access device, according to further possible embodiments.

A more detailed but non-limiting example of how an arrangement can be implemented in an access device to accomplish the solution, is illustrated by the block diagram in FIG. 4. A flow of actions is also indicated in this figure. The access device 400 is configured to handle data packets transferred in either direction between a user device 402 and a communication services network 404, as follows, e.g. by operating basically in the manner described above for FIG. 3.

The access device 400 comprises a user interface 400a with plural ports referred to as UNIs 1, 2, 3, . . . facing the user device 402 and an ANI facing the network 404. In this example, the user device 402 has been connected to UNI 1 although it could have been connected to any other port without affecting the following process. The user interface 400a is adapted to receive a first data packet "Pa(1)" coming from the user device 402, in an action 4:1, where the first data packet has a source address "SA" that may be a MAC address or other recognizable network address of the user device 402. The user interface 400a is somehow triggered to forward the first data packet Pa(1) to a packet analyzer 400b in the access device 400, in an action 4:2, effectively capturing the first packet for analysis. Some examples of possible triggering mechanisms for capturing the first packet were described above, which are not necessary to repeat here.

The access device 400 further comprises a packet analyzer 400b adapted to detect occurrence of service tag in the received first data packet Pa(1), in an action 4:3, the service tag indicating a type of communication service for which the user device is adapted. The packet analyzer 400b is further adapted to determine a packet handling rule "R(SA)" for the source address SA, in a further action 4:4, based on the detected occurrence of service tag in the first data packet. Some examples of determining and applying a packet handling rule were outlined above, which are possible to use here as well depending on the analysis of the first packet. Having learned how to handle packets directed to or coming from the user device 402, in terms of service tags, packet analyzer 400b forwards the source address SA to the user interface 400a, in another action 4:5, basically instructing the user interface 400a to forward any packets referring to that source address SA.

The access device 400 further comprises a packet processor 400c which may be configured to process upstream and downstream packets according to various filtering and/or scheduling mechanisms, which are outside the scope of this arrangement. According to this arrangement, the packet analyzer 400b also forwards the packet handling rule R(SA) to the packet processor 400c, in another action 4:6, basically instructing the packet processor 400c to apply the rule R(SA) when forwarding packets referring to the above source address SA either as a source address in upstream packets or as a destination address in downstream packets, or when forwarding packets referring to the port UNI 1 the first packet was received on in the user interface 400a. A conventional translation of the address between public and private addresses may also be employed in the process of forwarding the packets in the access device, which is however likewise outside the scope of this arrangement.

A further action 4:7, illustrates that one or more subsequent data packets "Pa(n)" with source address SA are received from the device 402 on the port UNI 1 of user interface 400a which then can forward the packets to the packet processor 400c, in a following action 4:8, based on the previously received source address SA in action 4:5. According to this arrangement, the packet processor 400c is adapted to handle occurrence of service tag in the subsequent data packets Pa(n) referring to the source address SA or to the port UNI 1 the first packet was received on, by applying the above-determined packet handling rule R(SA), in an action 4:9. Finally, the processed subsequent data packets Pa(n)' are sent out towards the network 404, in a final shown action 4:10.

As the subsequent upstream data packets are received on a specific port UNI 1 in the user interface 400a in this example, the user interface 400a may temporarily add a port identifier to the packets before sending them to the packet processor 400c in action 4:8, and the latter can thereby apply the packet handling rule R(SA) to the subsequent data packets in action 4:9 based on the port identifier.

The packet processor 400c can also apply this rule on downstream packets referring to source address SA or to port UNI 1, i.e. packets having that address or a public network address associated with the SA or with port UNI 1, as a destination address in the packets. Basically, if it has been learned in action 4:4 that the user device 402 is not capable of dealing with service tags, which is generally quite common for ordinary user devices, the packet processor 400c will add a service tag, identifying the relevant service, to upstream packets, which thus lack a service tag, and remove it from downstream packets. In the former case, the added service tag may be a VLAN ID (identity) or the equivalent, that has been configured by an operator of the communication services network to identify the communication service used by the user device.

Conversely, if it has been learned in action 4:4 that the user device 402 was actually using service tags, the resulting packet handling rule R(SA) would dictate that it is not necessary to remove the tag from downstream packets coming from the service network 404. In some cases, packet processor 400c may still process the service tag in some sense, e.g. by rewriting the tag before forwarding it either upstream or downstream. The packet handling rule R(SA) may additionally dictate how to perform such a rewriting of the service tag, which is however somewhat outside the scope of this solution.

When implementing this solution, a software mechanism is only needed in the packet analyzer 400b for analyzing the first packet and determining the packet handling rule R(SA), which rule is then enforced in the packet processor 400c such that the latter thus can basically "learn" the rule and apply it whenever packets arrive referring to the source address SA, or to a corresponding port the first packet was received on. Thereby, the forwarding of subsequent packets can be made fast without delaying analysis, allowing for high packet throughput or bandwidth and high speed data traffic. Further, it does not matter to which port the user connect the user device, this learning mechanism will work as described at any rate, and the above-described situation of customer complaints due to wrongly connected devices can be avoided. This solution is thus quite flexible by allowing for any change of connected user devices without manual intervention of the operator in the access device.

It should be noted that FIG. 4 merely illustrates various functional modules or units in the access device 400 in a logical sense, although the skilled person is free to implement these functions in practice using suitable software and hardware means. Thus, the invention is generally not limited to the shown structures of the access device 400, while its functional modules 400a-c may be configured to operate according to the features described for FIG. 3 above and FIGS. 5-7 below, where appropriate.

The functional modules 400a-c described above can be implemented in the access device 400 as program modules of a computer program comprising code means which when run by a processor "P" in the access device 400 causes the device 400 to perform the above-described functions and actions. The processor P may be a single CPU (Central processing unit), or could comprise two or more processing units. For example, the processor P may include general purpose microprocessors, instruction set processors and/or related chips sets and/or special purpose microprocessors such as ASICs (Application Specific Integrated Circuit). The processor P may also comprise a memory for caching purposes.

The computer program may be carried by a computer program product in the form of a memory "M" in the access device 400 connected to the processor P. The computer program product or memory M comprises a computer readable medium on which the computer program is stored. For example, the memory M may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the access device 400.

The above access device 400 and functional modules 400a-c can be configured according to various optional embodiments. For example, if the subsequent data packets are upstream packets lacking a service tag, the packet handling rule may dictate that a service tag is added to the packets before forwarding the packets to network 404. In another embodiment, the user interface 400a is further adapted to receive the subsequent data packets on a specific port in a user interface of the access device, and to add a port identifier to said packets. In that case, the packet processor 400c can be further adapted to apply the packet handling rule to the subsequent data packets based on the port identifier.

The user interface 400a may further be adapted to receive the first data packet and subsequent data packets directly from the user device or from a residential gateway to which the user device is connected.

If the subsequent data packets are downstream packets comprising a service tag, the packet handling rule may dictate that the packet processor 400c removes the service tag from the packets before forwarding the packets towards the user device.

The user interface 400a may be further adapted to capture the first data packet for detecting occurrence of service tag as triggered by detecting that the source address in said first data packet is unknown. If the source address is a MAC (Medium Access Control) address, the user interface 400a may be further adapted to capture the first data packet by means of a MAC address learning function.

Additionally or alternatively, the user interface 400a may be adapted to capture the first data packet for detecting occurrence of service tag as triggered by detecting that the first data packet refers to authentication, detecting connection to or disconnection from the access device, or triggered at preset intervals to refresh the packet handling rule.

Figure 5:
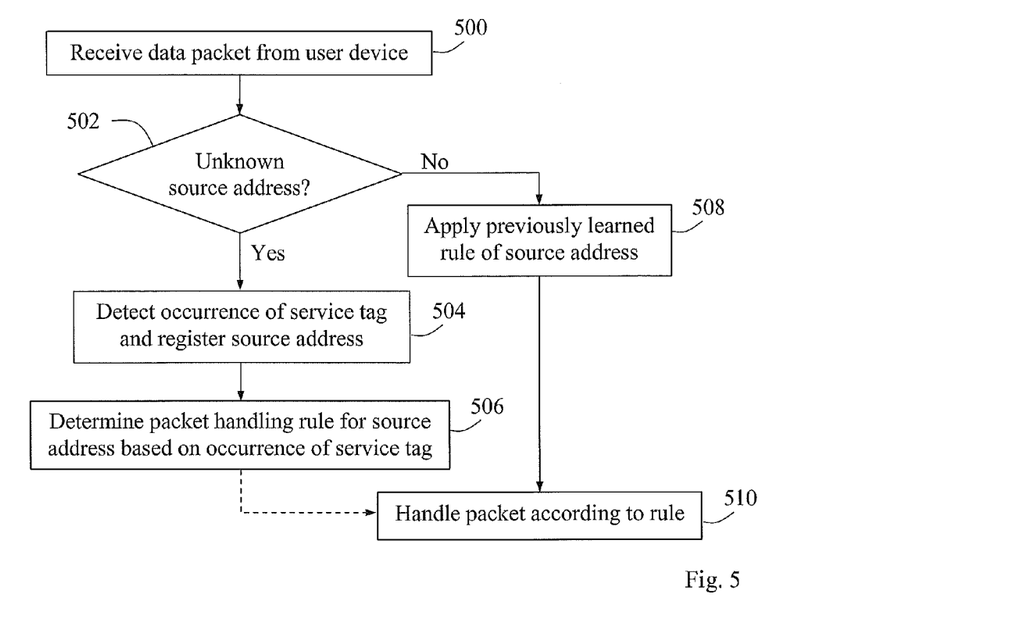
FIG. 5 is a flow chart of a possible procedure for handling upstream data packets in an access device, according to an exemplifying embodiment.

An exemplifying process of handling an incoming data packet in an access device which employs the solution according to any of the above-described features, will now be described with reference to the flow chart in FIG. 5. The different actions in this process can be executed by the functional modules 400a-c of FIG. 4, whenever appropriate. In a first action 500, the access device receives a data packet sent from a user device, e.g. coming in on one of multiple ports of a user interface in the access device.

It is then determined in a next action 502 if the received packet has an unknown source address or not, which would indicate whether it is a "first" packet or a subsequent one according to the terminology used above. This may be determined by comparing the received source address with a list of known source addresses of previously received packets maintained in the user interface. Alternatively, it may be determined if the source address is unknown or not based on which port the packet was received on provided that some ports have been registered as being used by known user devices. If the newly received address is not found in the list, it can be concluded that the packet was sent from an unknown user device and the packet is therefore captured for analysis in terms of service tags, e.g. made by the packet analyzer 400b of FIG. 4. Hence, the decision to capture an upstream packet for analysis can be either based on its source address or the port identity, depending on the implementation.

Accordingly, a next action 504 indicates that occurrence of service tag is detected in the received first data packet, i.e. whether the packet contains any service tag or not, and the received source address is also registered e.g. in the above-mentioned source address list, or the used port may alternatively be registered. In a further action 506, which may basically be executed jointly with action 504, a packet handling rule is determined for the received source address based on the detected occurrence of service tag in the first data packet, which may be done by the packet analyzer 400b of FIG. 4, as described above.

On the other hand, if it was determined in action 502 that the source address of the received packet is known, indicating that the packet is a subsequent one coming from a known user device, a previously learned packet handling rule of the received source address is applied in an action 508. In conclusion, the received packet is handled according to the packet handling rule, in a final action 510, which is either the previously learned rule from action 508, or the newly determined rule from action 506 as indicated by the dashed arrow.

Figure 6:
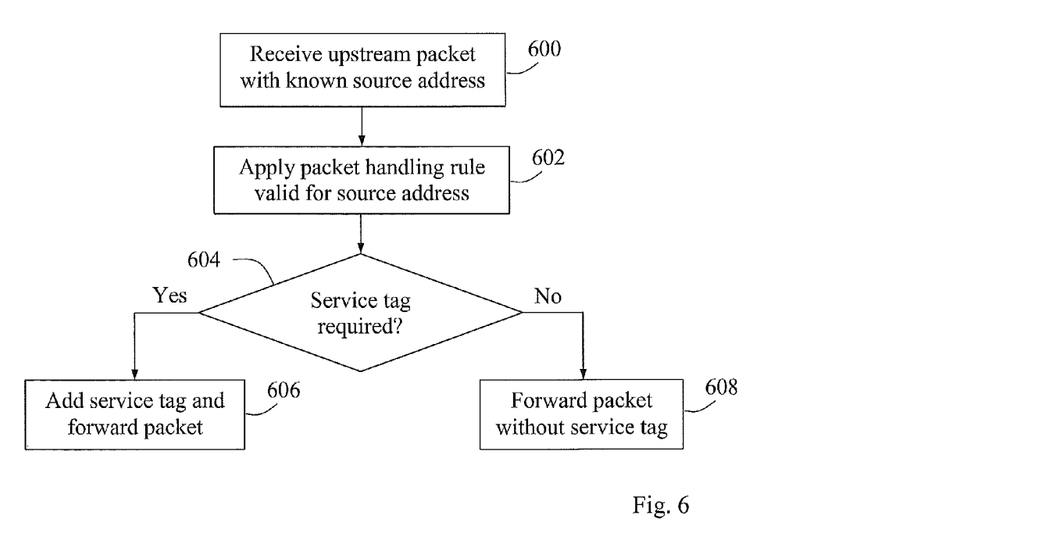
FIG. 6 is a flow chart of another possible procedure for handling upstream data packets in an access device, according to an exemplifying embodiment.

Another exemplifying process in an access device of handling an incoming upstream data packet with known source address but lacking a service tag, alternatively coming in on a previously registered port of a user interface, will now be described with reference to the flow chart in FIG. 6. As in the previous example, the different actions in FIG. 6 can be executed by the functional modules 400a-c of FIG. 4, whenever appropriate. In a first action 600, the access device receives the upstream data packet with known source address, directed to a communications service network. In a next action 602, the access device applies a previously learned packet handling rule that is valid for the received known source address, or alternatively for a previously registered port on which the packet was received. Action 602 can be done by the packet processor 400c in FIG. 4 in the manner described above.

It is then determined, in an action 604, whether the communications service network requires a service tag in the packet according to the rule, in order to route the packet and handle the corresponding service properly. If a particular service tag is required, the access device will add it to the packet and forward the packet towards the communications service network, in an action 606. Otherwise, the access device will forward the packet without service tag towards the communications service network, in an alternative action 608.

Figure 7:
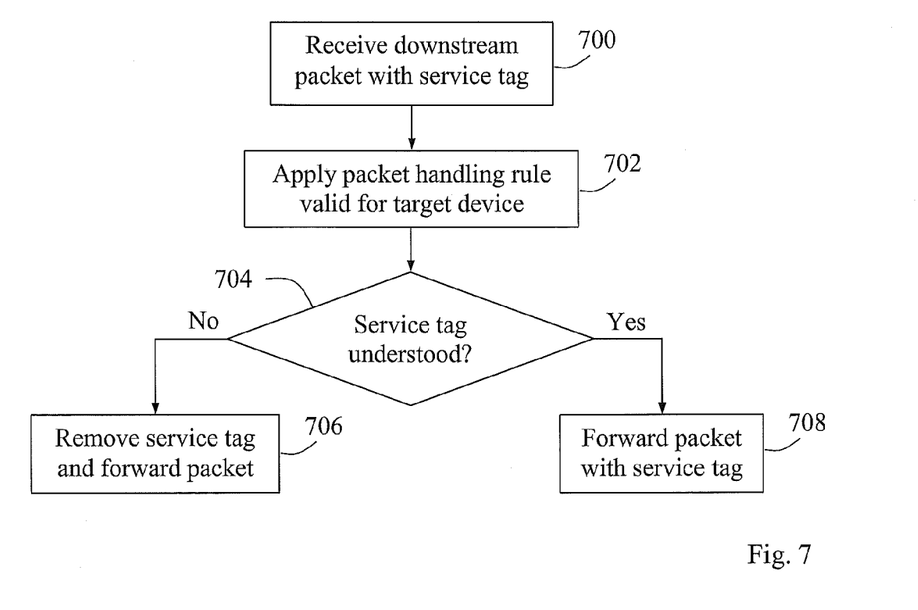
FIG. 7 is a flow chart of another possible procedure for handling downstream data packets in an access device, according to an exemplifying embodiment.

A third exemplifying process in an access device of handling an incoming downstream data packet with a service tag, will now be described with reference to the flow chart in FIG. 7. As in the previous example, the different actions in FIG. 7 can be executed by the functional modules 400a-c of FIG. 4, whenever appropriate. In a first action 700, the access device receives the downstream data packet with the service tag, directed to a known source address, i.e. a packet handling rule has previously been determined for that source address which corresponds to a connected user device. In a next action 702, the access device applies the packet handling rule valid for the source address the packer refers to. Action 702 can be done by the packet processor 400c in FIG. 4 in the manner described above.

It is then determined, in an action 704, whether a service tag should be included in downstream packets when forwarded towards the user device, according to the packet handling rule, which essentially indicates whether the user device is capable of understanding service tags or not. If not, the service tag is removed from the packet before forwarding the packet towards the user device, in an action 706, or otherwise the packet is forwarded towards the user device with the service tag, in an action 708.

It can be understood from the above description of various possible embodiments and features of the solution, that a forwarding mechanism can be achieved in the access device allowing for both flexibility of connected user devices and high throughput and data rates, without requiring the use of dedicated ports or manual intervention for reconfiguring the access device. The desirable feature of enabling "any service to any port" can be achieved. Further, this solution does not require costly hardware equipment but can rely on standard off-the-shelf components.

It is also possible to provide an access device that can handle the situation when multiple user devices communicate on a single cable connected to a single port of the access device. If these devices are sending a mix of tagged and untagged packets, a specific key is needed to identify each individual data flow for proper tag processing, which may be composed of a MAC address plus a port identity. Thereby, different packet handling rules can be applied to packets arriving on the same port but having different MAC addresses. It can be understood from the above description that any combination of source address and port identity may be used as a basis for service tags processing of both upstream and downstream packets.

While the invention has been described with reference to specific exemplary embodiments, the description is generally only intended to illustrate the inventive concept and should not be taken as limiting the scope of the invention. For example, the terms "user device", "communication services network", "first data packet", "access device", and "service tag" have been used throughout this description, although any other corresponding functions, parameters and/or nodes could also be used having the features and characteristics described here. The invention is defined by the appended claims.

The invention claimed is:

1. A method in an access device of handling data packets transferred between a user device and a communication services network, the method comprising: receiving a first data packet coming from the user device, the first data packet having a source address; determining if the source address of the first data packet is an unknown source address; in response to determining that the source address of the first data packet is an unknown source address, detecting an occurrence of a service tag in the received first data packet, said service tag indicating a type of communication service provided by a communication service provider in the communication services network; determining a packet handling rule for packets received from said source address based on the detected occurrence of service tag in the first data packet; and handling one or more subsequent data packets referring to said source address according to the packet handling rule.

2. The method according to claim 1, wherein the one or more subsequent data packets are upstream packets coming from the user device, said one or more subsequent data packets lacking a service tag, and wherein said packet handling rule dictates that a service tag is added to the one or more subsequent data packets before forwarding the one or more subsequent data packets to the communication services network.

3. The method according to claim 1, wherein the one or more subsequent data packets are upstream packets received on a specific port, and a port identifier is added to said one or more subsequent data packets, wherein the packet handling rule is applied to the one or more subsequent data packets based on the port identifier.

4. The method according to claim 1, wherein the first data packet and one or more subsequent data packets are upstream packets received directly from the user device or from a residential gateway to which the user device is connected.

5. The method according to claim 1, wherein the one or more subsequent data packets are downstream packets coming from the communication services network, said one or more subsequent data packets comprising a service tag, and wherein said packet handling rule dictates that the service tag is removed from the one or more subsequent data packets before forwarding the one or more subsequent data packets towards the user device without a service tag.

6. The method according to claim 1, wherein the source address is a MAC (Medium Access Control) address and the first data packet is captured by means of a MAC address learning function in the access device.

7. The method according to any of claim 1, wherein capturing the first data packet for detecting the occurrence of the service tag is triggered by any of: detecting that the first data packet refers to authentication, detecting connection to or disconnection from the access device, and preset intervals to refresh the packet handling rule.

8. The method according to claim 1, wherein the service tag is a VLAN tag comprising a VLAN (Virtual Local Area network) ID (identity) that has been configured by an operator of the communication services network to identify the communication service used by the user device.

9. An access device configured to handle data packets transferred between a user device and a communication services network, the access device comprising: a user interface adapted to receive a first data packet coming from the user device, the first data packet having a source address; a packet analyzer adapted to determine if the source address of the first data packet is an unknown address, in response to determining that the source address of the first data packet is an unknown source address, to detect occurrence of a service tag in the received first data packet, said service tag indicating a type of communication service provided by a communication service provider in the communication services network, and to determine a packet handling rule for packets received from said source address based on the detected occurrence of service tag in the first data packet; and a packet processor adapted to handle subsequent data packets referring to said source address according to the packet handling rule.

10. The access device according to claim 9, wherein the subsequent data packets are upstream packets coming from the user device, said subsequent data packets lacking a service tag, and wherein said packet handling rule dictates that a service tag is added to the subsequent data packets before forwarding the subsequent data packets to the communication services network.

11. The access device according to claim 9, wherein the user interface is further adapted to receive the subsequent data packets on a specific port and to add a port identifier to said subsequent data packets, wherein the packet processor is further adapted to apply the packet handling rule to the subsequent data packets based on the port identifier.

12. The access device according to claim 9, wherein the user interface is further adapted to receive the first data packet and one or more subsequent data packets directly from the user device or from a residential gateway to which the user device is connected.

13. The access device according to claim 9, wherein the subsequent data packets are downstream packets coming from the communication services network, said subsequent data packets comprising a service tag, and wherein said packet handling rule dictates that the packet processor removes the service tag from the subsequent data packets before forwarding the subsequent data packets towards the user device without a service tag.

14. The access device according to claim 9, wherein the source address is a MAC (Medium Access Control) address and the user interface is further adapted to capture the first data packet by means of a MAC address learning function.

15. The access device according to claim 9, wherein the user interface is further adapted to capture the first data packet for detecting the occurrence of the service tag when triggered by any of: detecting that the first data packet refers to authentication, detecting connection to or disconnection from the access device, and preset intervals to refresh the packet handling rule.

* * * * *

UNITED STATES PATENT AND TRADEMARK OFFICE
CERTIFICATE OF CORRECTION

PATENT NO.        : 8,699,489 B2  
APPLICATION NO.   : 12/976532  
DATED             : April 15, 2014  
INVENTOR(S)       : Nors Page 1 of 1

It is certified that error appears in the above-identified patent and that said Letters Patent is hereby corrected as shown below:

In the Claims

In Column 12, Line 53, in Claim 7, after "according to", delete "any of".

Signed and Sealed this  
Second Day of September, 2014

Michelle K. Lee  
*Deputy Director of the United States Patent and Trademark Office*